No. 623,808. Patented Apr. 25, 1899.
R. McALPINE.
MEANS FOR FORMING HOLLOW WARE OF PULP.
(Application filed Oct. 11, 1897.)
(No Model.) 6 Sheets—Sheet 5.
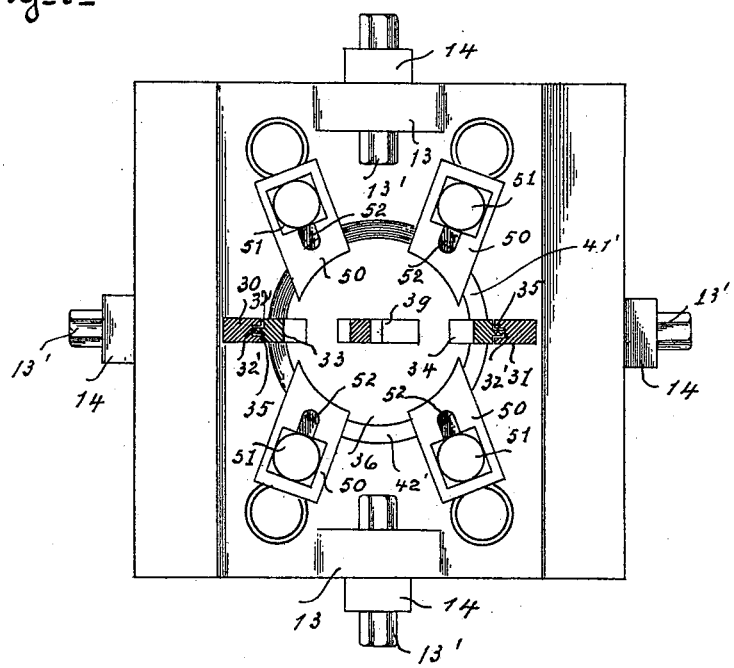
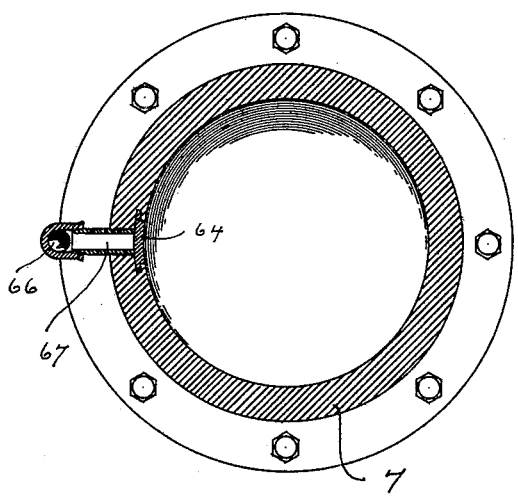
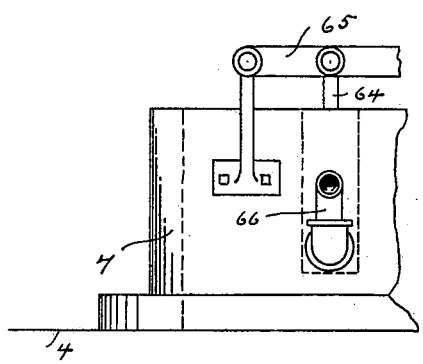
Witnesses
H. H. Martin
Maud Schumacher
Inventor
Robert McAlpine
By William Webster
Atty No. 623,808. Patented Apr. 25, 1899.
R. McALPINE.
MEANS FOR FORMING HOLLOW WARE OF PULP.
(Application filed Oct. 11, 1897.)

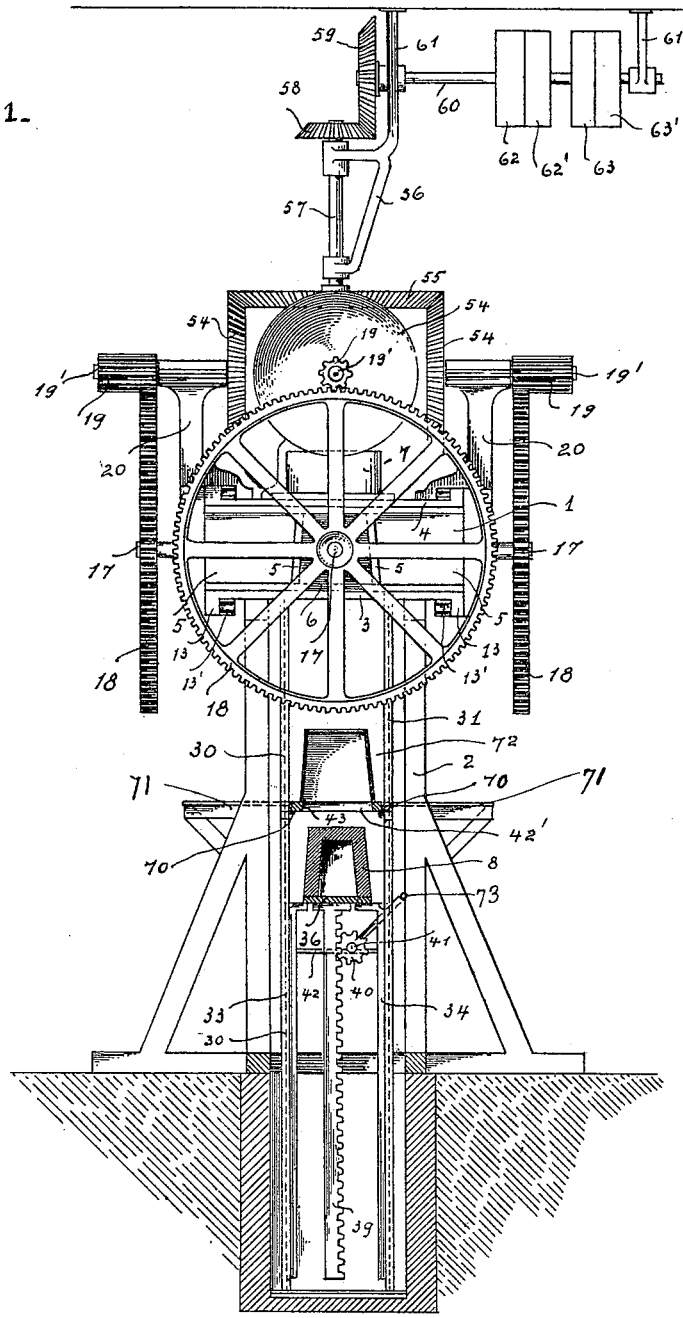

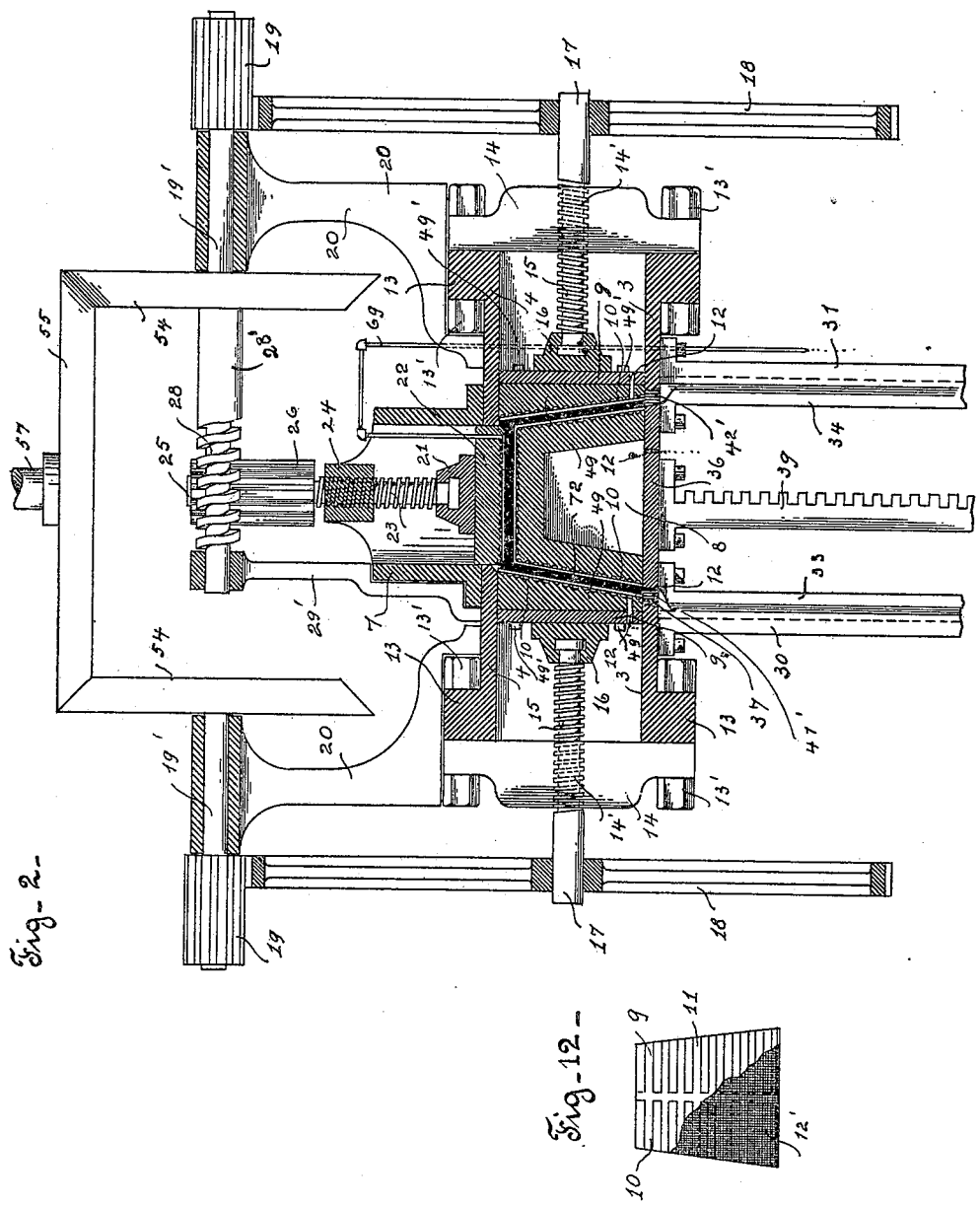

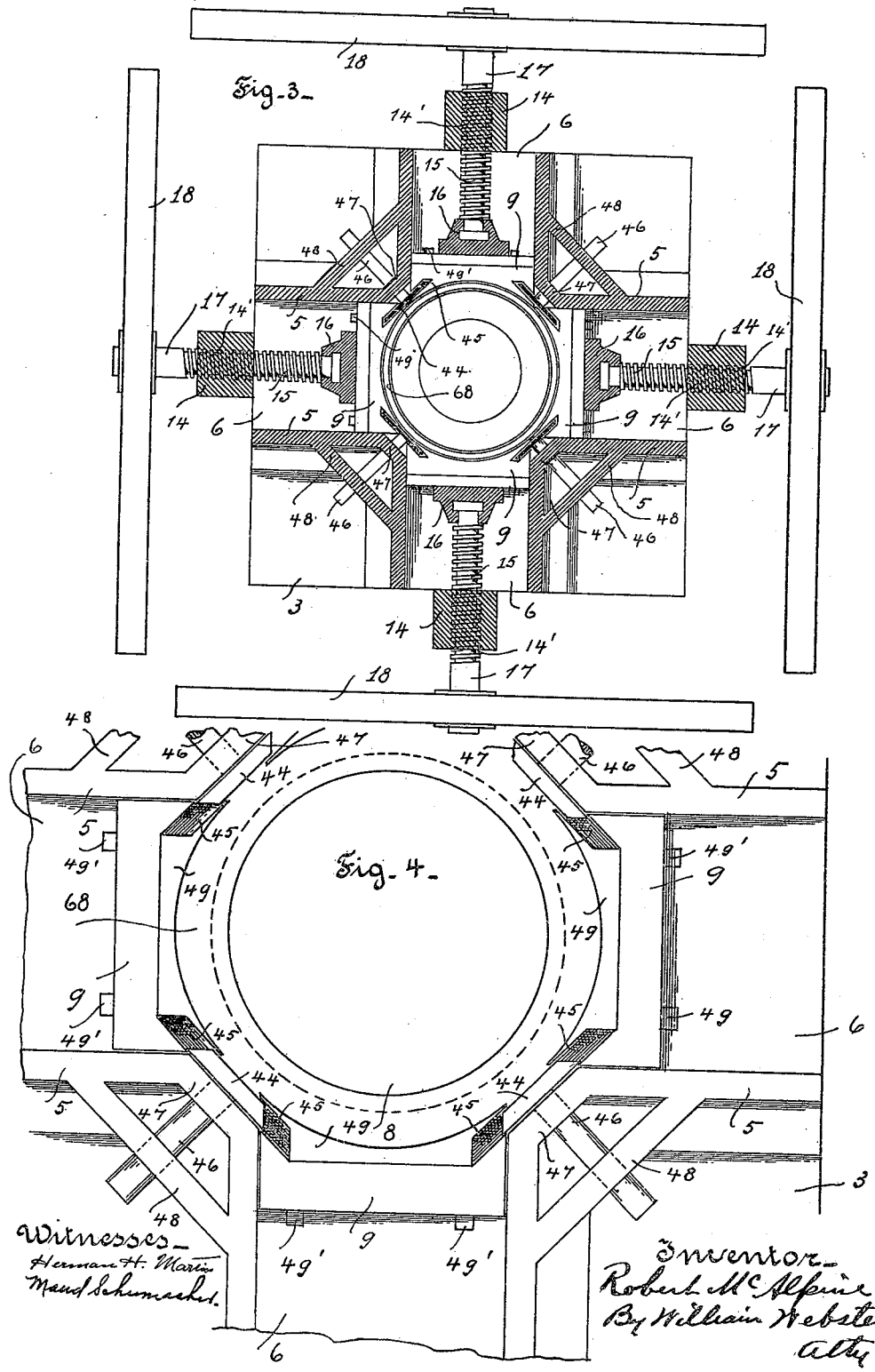

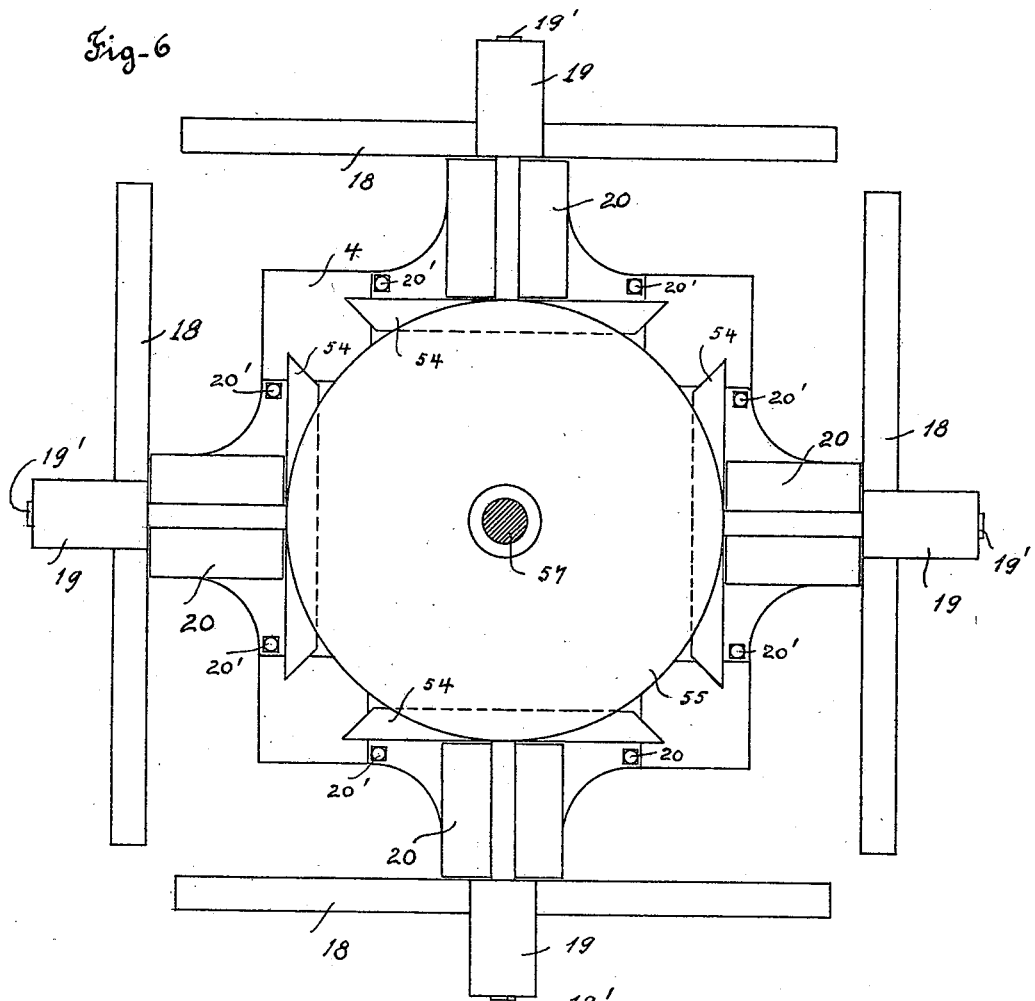
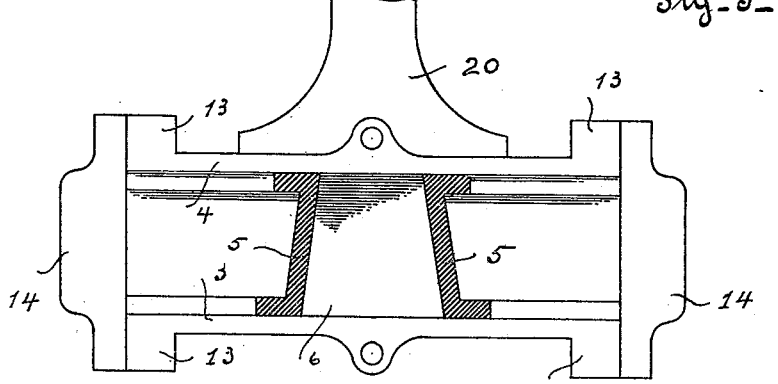

(No Model.) 6 Sheets—Sheet 6.

Witnesses
H. H. Martin
Maud Schumacher

Inventor
Robert McAlpine
By William Webster
Atty

UNITED STATES PATENT OFFICE.

ROBERT McALPINE, OF MARINETTE, WISCONSIN.

MEANS FOR FORMING HOLLOW WARE OF PULP.

SPECIFICATION forming part of Letters Patent No. 623,808, dated April 25, 1899.

Application filed October 11, 1897. Serial No. 654,752. (No model.)

*To all whom it may concern:*

Be it known that I, ROBERT MCALPINE, of Marinette, county of Marinette, and State of Wisconsin, have invented certain new and useful Improvements in Means for Forming Hollow Ware of Pulp; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention relates to means for forming hollow ware of pulp, and has for its object to provide mechanism for compressing semiplastic or fluid pulp to the proper desiccation to form a solid and compact mass of any desired form and adapted for various purposes.

A further object is to provide simultaneously-actuated radially-reciprocating pistons or rams located in radial chambers or cylinders, compressing the pulp by their inward movement around a form or core.

A further object is to adapt the actuating mechanism of the pistons or rams to retract the same upon completing the compression and to hold the pistons or rams in any desired intermediate position between complete compression and extreme extension proportionally to the fluidity of the pulp.

A further object is to adapt the central form or core to be removable from the forming-point, whereby the formed article is allowed to travel downward from the mechanism, and provide means whereby the formed article is held for removal at a point of suspension below the forming mechanism, and provide for further downward travel of the form or core, leaving the formed article free for removal. I have also provided means for connecting the radial pistons or rams to form a continuous unbroken circle around the form or core by the interposition of plates telescoping in slots formed within the pistons or rams upon the inward travel of the same, thereby establishing a complete felting process. I have also provided means for removing extracted water from pulp during the compression.

Figure 10:
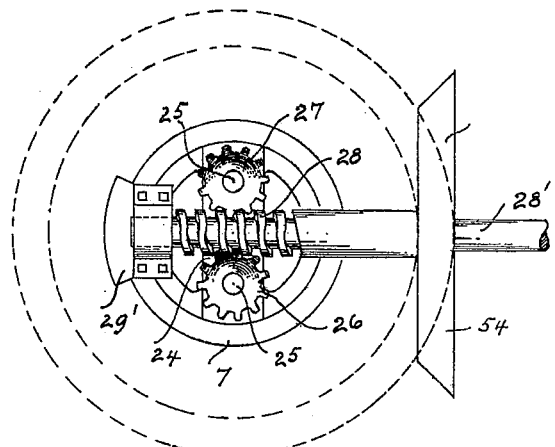
Figure 11:
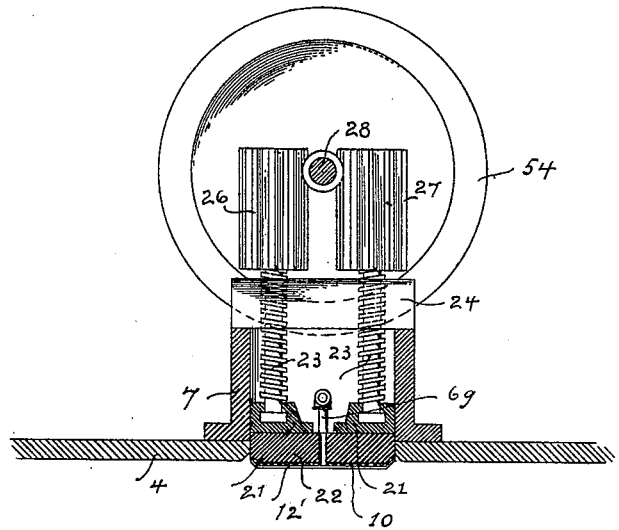

In the drawings, Figure 1 shows a complete mechanism constructed in accordance with my invention. Fig. 2 is a vertical cross-section through the radial pistons or rams, the central form or core, and the platens. Fig. 3 is a horizontal section through the mechanism, showing the top platen removed. Fig. 4 is an enlarged horizontal section through the radial pistons or rams, disclosing the telescopic plates connecting the pistons. Fig. 5 is a vertical section through the platen and radial pistons or rams. Fig. 6 is a top plan view of the actuating mechanism. Fig. 7 is a plan view of the under side of the bottom platen. Fig. 8 is a section through the cylinder secured to the top platen, showing the connection with the pulp-reservoir and cut-off valve. Fig. 9 is a side elevation of the same. Fig. 10 is a plan view of the actuating mechanism of the vertically-reciprocating piston or ram. Fig. 11 is a side elevation of the mechanism shown in Fig. 10. Fig. 12 is an elevation of the central form or core, showing the water-channels and foraminous or perforated covering.

In carrying out my invention I support the forming mechanism 1 upon a suitable frame 2, the forming mechanism comprising a bottom platen 3 and a top platen 4, both platens being connected and held apart by vertical risers 5, which form a plurality of radial chambers 6, and the cross-sections thereof are in relation to the ware to be manufactured.

7 designates a cylinder secured to the top platen 4 in a central position and in vertical alinement with a central form or core 8.

Located within the radial chambers are reciprocating pistons or rams 9, the inner sides 10 thereof conforming in parallel segmental relation to the central form or core 8. The inner sides 10 are preferably corrugated or grooved, forming channels 11 for the outflow of expressed water through ports 12, formed in the pistons or rams 9. A foraminous metal screen or perforated metal sheathing 12' is secured over the corrugations or grooves to present an even surface and also to prevent the escape of pulp through the ports 12.

Integral with the platens 3 and 4 and projecting downward and upward, respectively, are lugs 13, to which are secured by bolts 13' yokes 14, screw-threaded centrally in alinement with the radial reciprocating pistons or rams 9, and engaging the screw-threaded apertures 14' are coinciding screws 15, revolubly held in bearings 16, secured to the pistons or rams. The smooth shanks 17 of the screws 15 extend outwardly and beyond the yokes 14, and secured thereto are gear-wheels 18, the teeth of which intermesh with elongated pinions 19, mounted upon an arbor 19' and journaled in brackets 20, secured to the upper platen by bolts 20'. Two bearings 21 are secured to vertically-reciprocating piston 22, engaging inversely-threaded screws 23, which are in coincident engagement with screw-threaded apertures in yoke 24, integral with the cylinder 7, and secured to the projecting portion 25 of the screws 23 are inverse pinions 26 and 27, engaging opposite sides of a worm 28, which is formed on an inward extension 28' of one of the arbors 19', the inner end of said worm being supported by and journaled in an upright bracket 29', which is secured to the side of the cylinder 7. Secured to the under side of platen 3 are ways 30 and 31, having formed upon their inner faces 32 grooves 32'.

33 and 34 designate guides having oppositely-disposed tongues 35 engaging the grooves 32'. The guides are secured to a platen 36 of less diameter than the central aperture 37 in the lower platen 3.

39 designates a rack-bar secured to the platen 36 and engages a coincident gear-wheel 40, secured to an arbor 41, held in brackets 42.

Interposed in the annular space 41', formed by the platen 3 and the movable platen 36, is a ring 42', which is held by the inner side 43, contacting with the conical surface of the platen 36. To simultaneously compress the pulp in every direction upon the form or core 8, the horizontal reciprocating pistons or rams 9 are connected by plates 44, movably held in slots 45, formed in the adjacent sides of the reciprocating pistons or rams. Plates 44 are held in alinement by bars 46, which are movably held in diagonal braces or brackets 47 and 48 integral with the vertical risers 5. The inner surface of each piston or ram is preferably faced with a malleable metal 49, which is secured to the body 9 of the pistons or rams by bolts 49'. To the lower platen 3 are movably secured radial inwardly-projecting lugs 50, which are normally held in position by bolts 51, inserted through slots 52, formed centrally of the lugs. The object of the lugs is to lock the form or core secured to the movable platen 36, including the ring 42', in position during the compression, and they are withdrawn at the completion thereof previously to lowering the form or core and the completed article.

54 designate miter-gears mounted upon the arbors 19' at the inner side of the bracket-journals 20 and simultaneously engaging a horizontal miter-gear 55, which is supported from the ceiling by a hanger 56.

57 designates an arbor carrying the miter-gear 55 and has secured at its upper portion a miter-gear 58, the teeth thereof intermeshing with a gear 59, secured to a shaft 60, which is supported from the ceiling by hangers 61.

62 and 62' and 63 and 63' represent pulleys mounted in pairs upon the shaft 60 for the purpose of running the mechanism in either direction, one pulley in each pair being fast upon said shaft and the other being loose thereon.

In the operation of my device the form or core 8 is raised to its position in alinement with the horizontal chambers or cylinders 6 and the vertical cylinder 7, containing the horizontal and vertical reciprocating pistons or rams, which are extended outwardly and upwardly, respectively, proportionally to the fluidity of the pulp. 64 designates a gate-valve which is then opened by a lever 65, allowing the pulp to flow through a pipe 66, through a port 67, formed in the wall of the cylinder 7 into an annular space 68, formed by the extension of the pistons or rams. The port 67 is then closed and the mechanism set in motion by the shifting of the belt upon the pulley 62, causing the mechanism to revolve and transmit motion through the different screws 15, which upon revolving will cause the pistons or rams to travel inwardly and downwardly, respectively, compressing the pulp and expressing the water therefrom, which flows off through the corrugations or grooves into the ports 12 and through a siphon 69. The movement of the pistons or rams is simultaneous and uniform, and the material is evenly compressed upon the form or core. During the period of the inward travel of the pistons or rams the gear-wheels 18 travel inwardly upon and are in constant engagement with the elongated pinions 19. The compression being completed, a belt is shifted upon pulley 62', and a cross-belt is shifted from the pulley 63 to pulley 63', the motion being reversed, and the pistons or rams are caused to travel outward from the extreme compression-point. After releasing lugs 50 the form or core carrying platen 36, including the formed article, supported on the ring 42', is lowered in the ways 30 and 31 until the platform 71 is reached, when projections 70 thereon prevent the further descent of the ring 42', upon which the formed article 72 rests. The platen 36 and the form or core 8 are again lowered, extracting the form or core from the formed article, thereby leaving the same to be freely removed. The platen and form are now raised by the revolution of the gear-wheel 40 by a crank 73, actuating the rack-bar 39, until the conical form or core comes in contact with the ring 42' and causes the same to rise with the form and platen 36 until the normal position is reached, when the lugs 50 are forced inwardly to their normal position, locking the form or core and platen in position. The pulp is now allowed to flow into the annular space between the form or core and the extended pistons or rams, and the operation of the compression is repeated. I may also connect the lugs 50 by suitable mechanism in order to simultaneously operate them when the former has attained its normal position.

The telescopic plates connecting the radial segmental pistons or rams compress the pulp evenly and obviate projecting ridges or shoulders upon the periphery of the formed article by imperfect felting, due to non-continuous pistons or rams. I may also raise or lower the form or core carrying platen 36 by hydraulic means.

What I claim is—

1. In a machine for forming hollow ware from pulp, the combination of a supporting-frame, an upper platen and a lower platen supported thereon, radial partitions secured between the platens forming radial chambers, a cylinder secured to the upper platen, a piston in said cylinder, and means for actuating said piston, a movable form or core in alinement with said cylinder, and arranged to be moved into central alinement with said radial chambers, means for moving said form or core, pistons in said radial chambers, yokes secured to the upper and lower platens across said chambers, and provided with screw-threaded apertures in alinement with said piston, screws engaging said screw-threaded apertures in the yokes and journaled and secured to said pistons, gear-wheels rigidly mounted upon the outer ends of said screws, elongated pinions engaging said gear-wheels, means for rotating said pinions, a pulp-inlet, a cut-off valve, outlet-ports for the expressed water, and a movable central portion for allowing of the removal of the finished article, substantially as described.

2. In an apparatus for forming hollow ware from pulp, the combination of an upper and a lower platen, a plurality of radial chambers between said platens, the lower platen having a central aperture, vertical guideways extending below said lower platen, vertically-movable guides in engagement with said guideways, a central movable platen, a form or core carried thereby, a pendent rack-bar connected to said platen, a toothed gear engaging said pendent rack-bar, means for rotating said gear and moving said rack-bar, a ring loosely fitting upon the periphery of the movable platen, a platform beneath said platens having an opening for the passage of the central platen and projections therein to arrest the downward movement of the finished article, adjustable lugs attached to the under side of the lower platen adapted to lock the ring and the form or core, a pulp-inlet, a cut-off and ports to drain the expressed water from the forming mechanism, substantially as described.

3. In an apparatus for forming hollow ware from pulp, the combination of upper and lower platens, radial partitions secured between said platens and forming radial horizontal chambers, a vertical cylinder secured to the upper platen, a piston therein, and connections for the flow of pulp, a form or core arranged to be moved into central alinement with the said horizontal chambers, pistons located in the said horizontal chambers having vertical side slots in alinement with slots in the adjacent pistons, metallic plates fitting loosely in said slots and movable with said pistons, radial bars secured to said metallic plates, guides for said radial bars, and means for actuating the pistons simultaneously, substantially as described.

4. In an apparatus for forming hollow ware from pulp, the combination of the upper and lower platens, radial horizontal chambers between said platens, a vertical cylinder secured to the upper platen, a piston in said cylinder, a form or core adapted to be moved into central alinement with the horizontal chambers, pistons located in the said horizontal chambers having vertical side slots in alinement with the slots in the adjacent piston, plates fitting in said slots and movable with said pistons, guides for said plates, and means for actuating said pistons simultaneously, substantially as described.

5. In an apparatus for forming hollow ware from pulp, the combination of a frame, platens supported thereon having radial chambers formed between the same, a central movable core, a vertical cylinder mounted upon the upper platen, a piston in said vertical cylinder, screws for reciprocating said piston, a yoke having screw-threaded apertures for the passage of said screws, elongated pinions forming axial continuations of said screws, pistons in said radial chambers, a worm passing between said elongated pinions and engaging both, means for rotating said worm, pistons in said radial chambers, and means for reciprocating said pistons simultaneously, outlet-ports formed in the pistons for the escape of the expressed water, a pulp-supply port, means for raising or lowering the form or core, and means for detaching the finished article therefrom, substantially as described.

In testimony that I claim the foregoing as my own I hereby affix my signature in presence of two witnesses.

ROBERT McALPINE.

Witnesses:
WILLIAM WEBSTER,
MAUD SCHUMACHER.